US012688644B2

(12) United States Patent
Fazal et al.

(10) Patent No.: US 12,688,644 B2
(45) Date of Patent: Jul. 21, 2026

(54) HYBRID STATISTICAL AND MACHINE LEARNING METHOD AND SYSTEM FOR RADIO FREQUENCY (RF) SPECTRUM PROPAGATION MODELING AND PREDICTION

(71) Applicants: AT&T Intellectual Property I, L.P., Atlanta, GA (US); George Mason University, Fairfax, VA (US)

(72) Inventors: Abbas Munawar Fazal, Bridgewater, NJ (US); Yu Zhou, Somerset, NJ (US); Syed Anwar Aftab, Budd Lake, NJ (US); Panneer Selvam Santhalingam, Staten Island, NY (US); Parth Pathak, Centreville, VA (US)

(73) Assignees: AT&T Intellectual Property I, L.P., Atlanta, GA (US); George Mason University, Fairfax, VA (US)

( * ) Notice: Subject to any disclaimer, the term of this patent is extended or adjusted under 35 U.S.C. 154(b) by 251 days.

(21) Appl. No.: 18/441,458

(22) Filed: Feb. 14, 2024

(65) Prior Publication Data

US 2025/0259374 A1 Aug. 14, 2025

(51) Int. Cl.
*G06T 15/06* (2011.01)
(52) U.S. Cl.
CPC .................................... *G06T 15/06* (2013.01)
(58) Field of Classification Search
None
See application file for complete search history.

(56) References Cited

U.S. PATENT DOCUMENTS

2023/0284048 A1* 9/2023 O'Shea ................. H04W 24/04
370/329
2024/0284192 A1* 8/2024 Tomie .................. H04B 17/373
2024/0323719 A1* 9/2024 Corgan ................. H04W 24/06
(Continued)

OTHER PUBLICATIONS

De Sousa, Marcelo N., and Reiner S. Thoma. "Mobile station localization emitter in urban NLOS using multipath ray tracing fingerprints and machine learning." 2018 8th International Conference on Localization and Gnss (ICL-GNSS). IEEE, 2018. (Year: 2018).*

(Continued)

*Primary Examiner* — Nurun Flora
(74) *Attorney, Agent, or Firm* — Guntin & Gust, PLC; Kenneth S. Kwan

(57) ABSTRACT

Aspects of the subject disclosure may include, for example, obtaining data regarding an environment associated with a cell site, identifying one or more coverage pivots from a plurality of coverage locations in the environment, utilizing one or more machine learning (ML) models to determine emission directions for the one or more coverage pivots based at least in part on locations of the one or more coverage pivots and the cell site in the environment, resulting in determined emission directions, and causing ray tracing simulation to be performed using the determined emission directions, wherein the ray tracing simulation enables first signal coverage estimates to be derived for the one or more coverage pivots and used to extrapolate second signal coverage estimates for a remainder of the plurality of coverage locations. Other embodiments are disclosed.

20 Claims, 10 Drawing Sheets

(56)          References Cited

U.S. PATENT DOCUMENTS

2024/0364565  A1*  10/2024  Gilbert ............... H04L 25/0254

OTHER PUBLICATIONS

Hoydis, Jakob, et al. "Learning radio environments by differentiable ray tracing." IEEE Transactions on Machine Learning in Communications and Networking (2024) (Year: 2024).*

"Evaluating Compliance with FCC Guidelines for Human Exposure to Radiofrequency Electromagnetic Fields", OET Bulletin 65: Edition 97-01, Aug. 1997, 84 Pages.

Gupta, Ankit , et al., "Machine Learning-based Urban Canyon Path Loss Prediction using 28 GHZ Manhattan Measurements", arXiv:2202.05107v1 [cs.IT] Feb. 10, 2022, 15 Pages.

Levie, Ron , et al., "RadioUNet: Fast Radio Map Estimation with Convolutional Neural Networks", arXiv:1911.09002v3 [eess.SP] Dec. 22, 2020, Dec. 23, 2020, 24 Pages.

Qi, Charles R., et al., "PointNet: Deep Learning on Point Sets for 3D Classification and Segmentation", arXiv:1612.00593v2 [cs.CV] Apr. 10, 2017, 19 Pages.

Zhang, Xin , et al., "Cellular Network Radio Propagation Modeling with Deep Convolutional Neural Networks", arXiv:2110.01848v1 [cs.IT] Oct. 5, 2021, 9 Pages.

\* cited by examiner

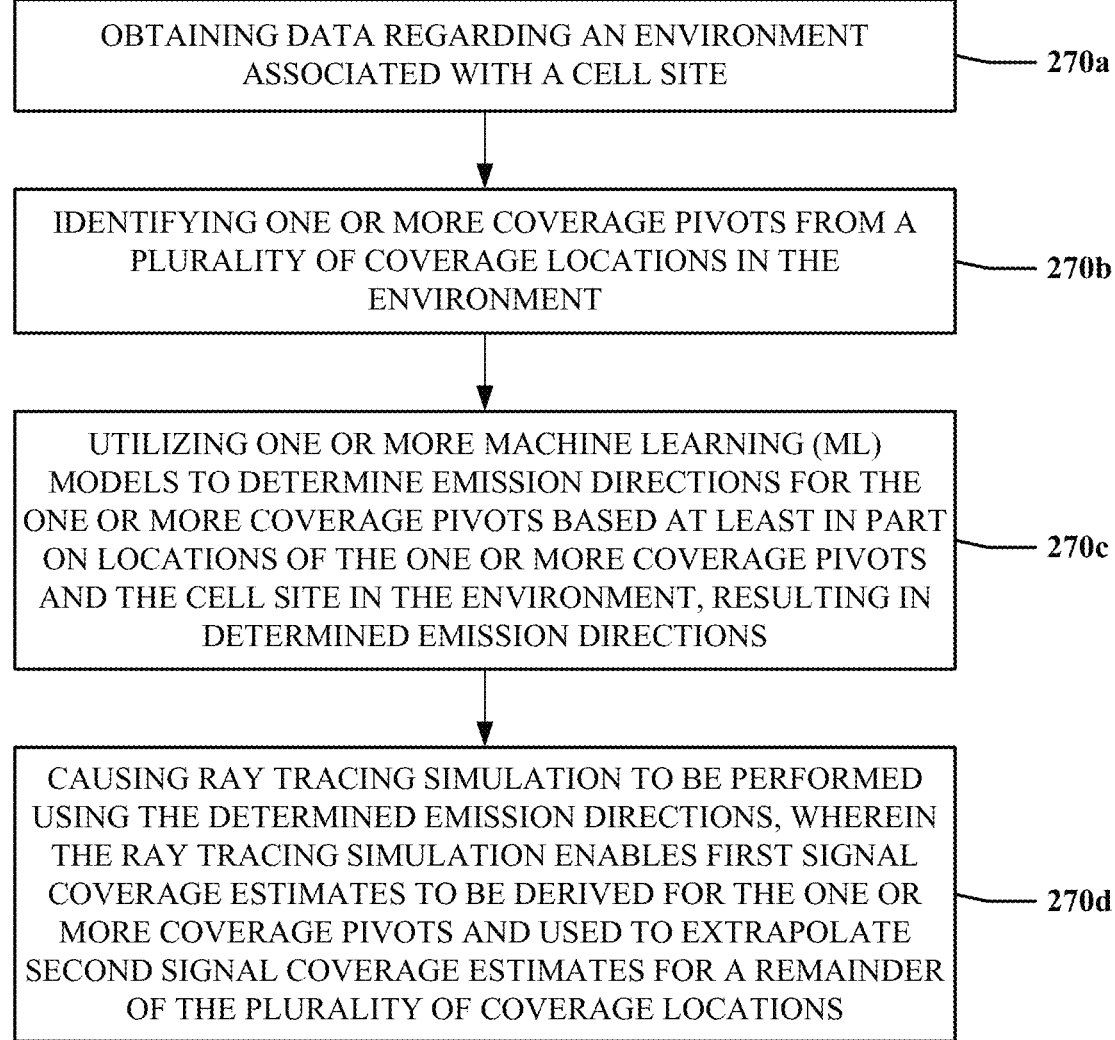

OBTAINING DATA REGARDING AN ENVIRONMENT ASSOCIATED WITH A CELL SITE ⎯ 270a

IDENTIFYING ONE OR MORE COVERAGE PIVOTS FROM A PLURALITY OF COVERAGE LOCATIONS IN THE ENVIRONMENT ⎯ 270b

UTILIZING ONE OR MORE MACHINE LEARNING (ML) MODELS TO DETERMINE EMISSION DIRECTIONS FOR THE ONE OR MORE COVERAGE PIVOTS BASED AT LEAST IN PART ON LOCATIONS OF THE ONE OR MORE COVERAGE PIVOTS AND THE CELL SITE IN THE ENVIRONMENT, RESULTING IN DETERMINED EMISSION DIRECTIONS ⎯ 270c

CAUSING RAY TRACING SIMULATION TO BE PERFORMED USING THE DETERMINED EMISSION DIRECTIONS, WHEREIN THE RAY TRACING SIMULATION ENABLES FIRST SIGNAL COVERAGE ESTIMATES TO BE DERIVED FOR THE ONE OR MORE COVERAGE PIVOTS AND USED TO EXTRAPOLATE SECOND SIGNAL COVERAGE ESTIMATES FOR A REMAINDER OF THE PLURALITY OF COVERAGE LOCATIONS ⎯ 270d

HYBRID STATISTICAL AND MACHINE LEARNING METHOD AND SYSTEM FOR RADIO FREQUENCY (RF) SPECTRUM PROPAGATION MODELING AND PREDICTION

FIELD OF THE DISCLOSURE

The subject disclosure relates to a hybrid statistical and machine learning (ML) method and system for radio frequency (RF) spectrum propagation modeling and prediction.

BACKGROUND

Wireless network providers today face the daunting challenge of designing their telecommunications networks to not only scale to millions of mobile devices, but also to provide sufficient coverage and capacity. Signal propagation modeling is usually employed in network coverage planning to ensure that RF safety guidelines and requirements are met, that signals do not unduly cause interference, that there is minimal interference from nearby cells, and that signals reach intended areas such that there is a suitable coverage footprint.

BRIEF DESCRIPTION OF THE DRAWINGS

Reference will now be made to the accompanying drawings, which are not necessarily drawn to scale, and wherein:

FIG. 2B shows statistics on photon emission directions for 678 different coverage locations.

FIG. 2D depicts an illustrative embodiment of a method in accordance with various aspects described herein.

DETAILED DESCRIPTION

Figure 1A:
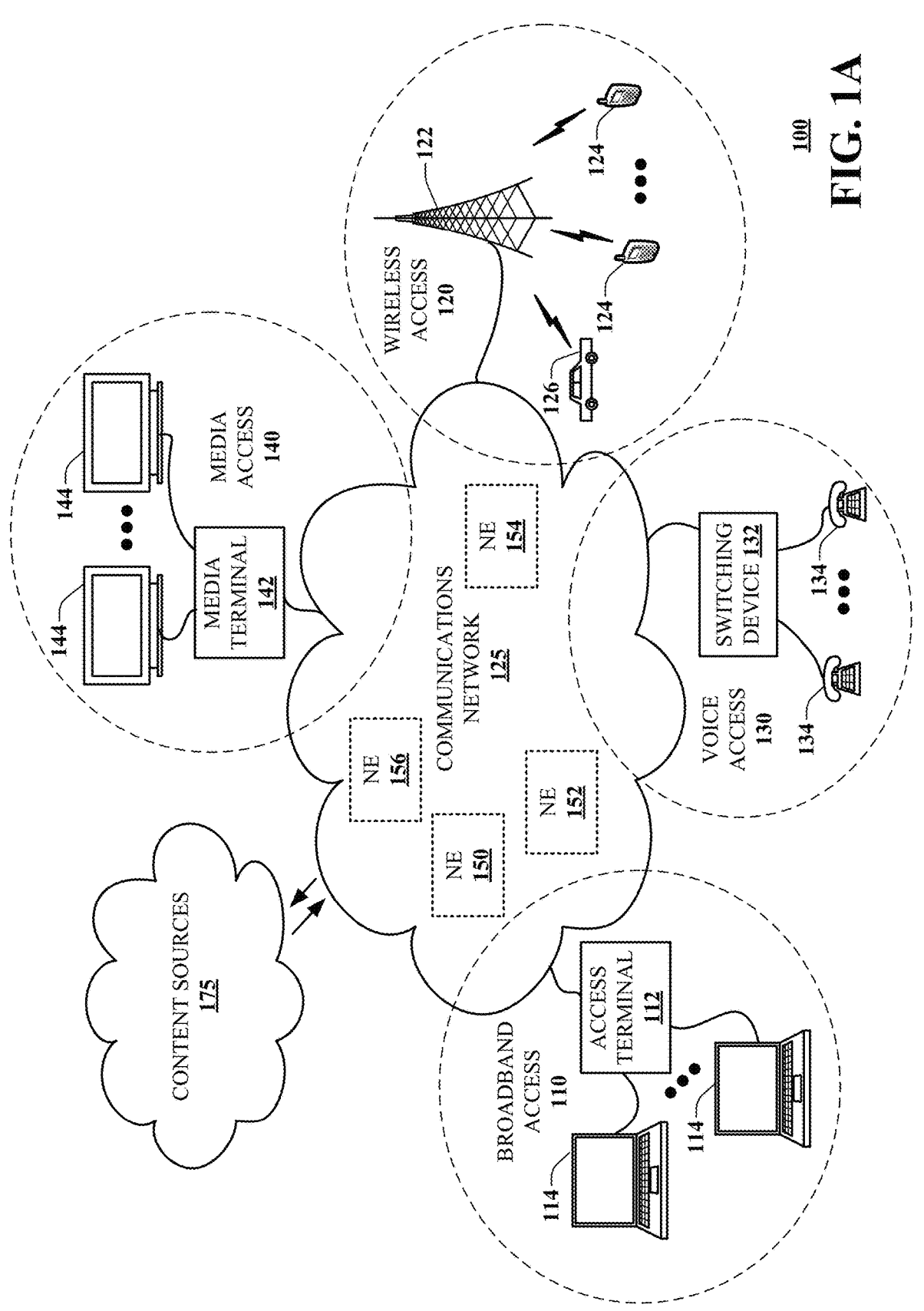
FIG. 1A is a block diagram illustrating an exemplary, non-limiting embodiment of a communications network in accordance with various aspects described herein.

Ray tracing is typically performed to model, simulate, and predict the behavior of radio waves in complex environments. It considers the physical properties of the surroundings, such as buildings, terrain, and foliage, to provide accurate coverage predictions. Conventional ray tracing modeling is computationally expensive, however, since it involves issuing numerous (e.g., millions) of photons in all directions and performing processing for all such directions.

The subject disclosure describes illustrative embodiments of a signal propagation modeling and prediction framework/platform that facilitates prediction of received RF signal strengths at different coverage locations within a coverage area of a wireless communication system (e.g., a 5G system, a 6G system, or a higher generation system). In exemplary embodiments, the platform employs a hybrid approach that leverages deep learning to enhance the efficiency of, or otherwise reduce the load on, ray tracing simulations. In various embodiments, deep learning models may be trained to predict wireless channel parameters—e.g., Reference Signal Received Power (RSRP) value(s) for each coverage location, by exploiting three-dimensional (3D) environment information. In one or more embodiments, a 3D coverage map may be predicted for a given scenario, such as one in which a single cell site is centered among various coverage locations (i.e., locations with probable user or user equipment (UE) presence). A coverage location may be defined as a cube, sphere, or other geometric shape or combination of shapes. For instance, coverage locations may be defined as cubes that have a two-meter cubic volume in an overall coverage area. In exemplary embodiments, select coverage locations—i.e., coverage pivots—may be identified for estimating signal propagation, where the estimations may be extrapolated for other coverage locations. Additional aspects of the exemplary hybrid approach are discussed in more detail below.

Existing signal propagation modeling approaches are completely data driven and estimate RSRP values via mere statistical analysis. Exemplary embodiments instead provide for deep learning-based predictions of suitable photon emission directions based on supervised training that characterizes the relationships between Tx, Rx, the environment, and signal propagation directions. By filtering the coverage locations to (e.g., only) select coverage pivots and photon emissions in select azimuth and elevation angle combinations, this knowledge can be imported or integrated into a ray tracing simulator to (e.g., directly) estimate signal propagation without having to perform conventional ray tracing processing that would otherwise be required to model the environment. This allows for reduced ray tracing, and thus faster and less resource intensive signal propagation modeling.

The ability to optimize or improve signal propagation modeling and estimate received signal power at any given location, as described herein, has various applications, including, coverage estimation/planning for urban areas and/or indoor areas, RF exposure evaluation or validation, antenna configuration optimization, drone route planning, and so on. Again, while the sole use of existing tools, such as ray tracing simulators, may facilitate such modeling, the amount of time and computational resources required by these tools to generate estimates makes them inefficient even for a reasonably sized network. Given the extraordinarily complex deployment of today's mobile networks and their large coverage regions, a purely measurement-based approach to optimize RF signal propagation quickly becomes infeasible.

The deep learning modeling described herein is highly capable and scalable even to large, complex urban and suburban deployment areas. It will be understood and appreciated that methods described herein can be used at different stages of network planning and deployment within the telecommunications industry.

One or more aspects of the subject disclosure include a method. The method can comprise obtaining, by a processing system including a processor, data regarding an environment associated with a cell site. Further, the method can include identifying, by the processing system, one or more coverage pivots from a plurality of coverage locations in the environment. Further, the method can include utilizing, by the processing system, one or more machine learning (ML) models to determine emission directions for the one or more coverage pivots based at least in part on locations of the one or more coverage pivots and the cell site in the environment, resulting in determined emission directions. Further, the method can include causing, by the processing system, ray tracing simulation to be performed using the determined emission directions, wherein the ray tracing simulation enables first signal coverage estimates to be derived for the one or more coverage pivots and used to extrapolate second signal coverage estimates for a remainder of the plurality of coverage locations.

One or more aspects of the subject disclosure include a device, comprising a processing system including a processor, and a memory that stores executable instructions that, when executed by the processing system, facilitate performance of operations. The operations can include receiving data regarding an environment associated with a cell tower. Further, the operations can include selecting one or more coverage pivots from a plurality of coverage locations in the environment. Further, the operations can include employing one or more deep learning models to determine photon emission directions for the one or more coverage pivots based at least in part on locations of the one or more coverage pivots and the cell tower, resulting in determined photon emission directions. Further, the operations can include causing a ray tracing simulator to simulate ray tracing only for the determined photon emission directions, wherein the ray tracing enables first signal coverage estimates to be derived for the one or more coverage pivots and used to extrapolate second signal coverage estimates for a remainder of the plurality of coverage locations.

One or more aspects of the subject disclosure include a non-transitory machine-readable medium, comprising executable instructions that, when executed by a processing system including a processor, facilitate performance of operations. The operations can include receiving information regarding determined emission directions. Further, the operations can include performing ray tracing simulations based on the information, wherein the determined emission directions are output by one or more deep learning models that are trained to determine directions in which emissions are to be made, and wherein the one or more deep learning models are utilized to determine directions in which emissions are to be made for one or more coverage pivots selected from a plurality of coverage locations in an environment that includes a cell site, resulting in the determined emission directions.

Other embodiments are described in the subject disclosure.

Referring now to FIG. 1A, a block diagram is shown illustrating an example, non-limiting embodiment of a system 100 in accordance with various aspects described herein. For example, system 100 can facilitate, in whole or in part, prediction of received RF signal strength at different coverage locations within a coverage area of a wireless communication system. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 1C:
FIG. 1C is a diagram of an example ray tracing simulator in accordance with various aspects described herein.
Figure 1B:
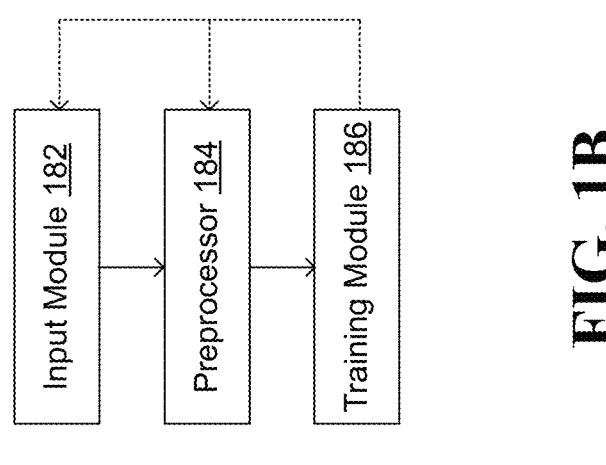
FIG. 1B is a diagram of an example artificial intelligence (AI) architecture in accordance with various aspects described herein.

FIG. 1B is a diagram of an example AI architecture 180 in accordance with various aspects described herein. As shown in FIG. 1B, the AI architecture 180 may include an input module 182, a preprocessor 184, and a training module 186. Some or all of these modules, which may be referred to as programs, processors, or agents, may be realized based on execution of instructions or data by one or more processors of a computing (or ML) system, such as the computing (or ML) system 600 of FIG. 6 (described in more detail below). In various embodiments, the AI architecture 180 may be used to facilitate, in whole or in part, prediction of received RF signal strength at different coverage locations within a coverage area of a wireless communication system.

The input module 182 may allow for input of (e.g., user-provided) data, such as datasets, parameters, etc., that can be used to train models and/or obtain predictions from models. In some cases, datasets may be labeled and may include inputs (e.g., observed or measured values) and known output data. Labeled datasets may facilitate supervised (or guided) learning. Although not shown in FIG. 1B, the AI architecture 180 may include a library of ML models or algorithms, such as, for instance, one or more classifiers (e.g., a naïve Bayes classifier or the like), one or more support vector machines, one or more artificial neural networks, one or more learned decision trees, and so on. Each of the ML algorithms may be associated with various parameters.

The preprocessor 184 may be equipped with one or more preprocessing algorithms that are configured to prepare input datasets for processing by the training module 186. Such preprocessing may include discretization (where values are binned or converted into nominal values), component analysis, data estimation, feature selection, feature extraction (e.g., dimensionality reduction, data removal, statistical analysis, threshold-based filtering, etc.), data interpolation, and/or the like.

The training module 186 may be configured to train and evaluate ML models. As an example, the training module 186 may be configured to perform unsupervised learning and/or supervised learning based in input datasets. In exemplary embodiments, the training module 186 may be capable of training and/or evaluating the performance of multiple models in parallel. In one or more implementations, the training module 186 may, despite operating on multiple ML models in parallel, train and evaluate the various ML models individually. In some implementations, the training module 186 may be capable of combining the procedure outcomes of multiple models to derive an aggregate outcome. Model evaluation or validation may involve a comparison of model outputs to known outputs or an analysis of model outputs relative to desired metrics (e.g., relating to performance, disparity, etc.).

Although not shown, the AI architecture 180 may include additional functional modules, such as those for gathering performance results and presenting (e.g., displaying) data regarding the results. While various components, modules, etc. may have been illustrated in FIG. 1B as separate components, modules, etc., it will be appreciated that multiple components, modules, etc. can be implemented as a single component, module, etc., or a single component, module, etc. can be implemented as multiple components, modules, etc. Additionally, functions described as being performed by one component, module, etc. may be performed by multiple components, modules, etc., or functions described as being performed by multiple components, modules, etc. may be performed by a single component, module, etc.

FIG. 1C is a diagram of an example ray tracing simulator 190 in accordance with various aspects described herein. In one or more embodiments, the ray tracing simulator 190 may be implemented in hardware and/or software, and may be configured to provide simulations of the propagation of electromagnetic (e.g., optical) wavefronts in an environment. Generally speaking, rays are lines that are defined based on discrete points that represent local wavefront positions as they propagate through the environment. Travelling in straight lines, rays may change direction at refractive boundaries in accordance with Snell's Law and reflect at boundaries in accordance with the Law of Reflection. In various embodiments, the ray tracing simulator 190 may be capable of integrating these properties of rays as well as other additional ray properties, such as, for instance, intensity, polarization, optical path, and so on, and modifying some or all of these attributes at interfaces as rays become incident on surfaces. Complex interfaces, such as diffractive elements or non-homogeneous media, may be simulated using specialized equations that govern gradient index materials and vector grating diffraction that can influence the ray's direction and behavior. In exemplary embodiments, the ray tracing simulator 190 may be configured to model signal propagation in environments so as to aid in the prediction of cellular signal strength and/or reach in different coverage areas. By simulating how electromagnetic waves/particles propagate or travel through a given space-accounting for factors like obstacles, buildings, and terrain—the ray tracing simulator 190 may provide insight into signal behavior. Although not shown, in various embodiments, the AI architecture 180 of FIG. 1B and the ray tracing simulator 190 of FIG. 1C may be communicatively coupled with one another either directly or via one or more intermediary devices or systems that facilitate communications therebetween.

Figure 2A:
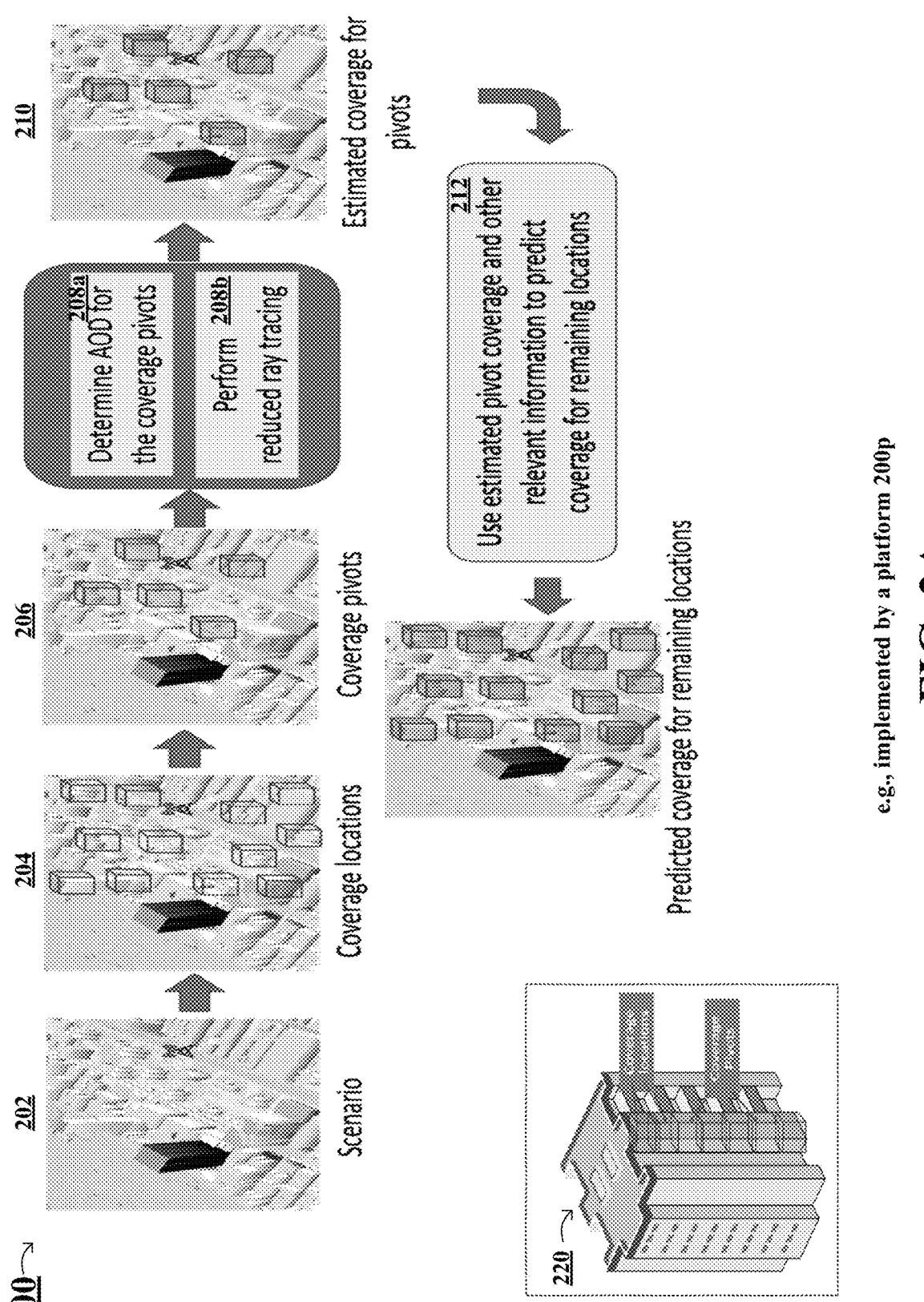
FIG. 2A shows an example, non-limiting pipeline or flow of a hybrid signal propagation modeling and prediction platform, in accordance with various aspects described herein.

FIG. 2A shows an example, non-limiting pipeline or flow 200 of a hybrid signal propagation modeling and prediction platform 200*p*, in accordance with various aspects described herein. In exemplary embodiments, the hybrid signal propagation modeling and prediction platform 200*p* may correspond to, or otherwise include, the AI architecture 180 of FIG. 1B and the ray tracing simulator 190 of FIG. 1C. In one or more embodiments, the hybrid signal propagation modeling and prediction platform 200*p* may facilitate 3D signal coverage estimation for a given environment.

As a preface to the description of the pipeline 200, a fair assumption can be made that, if the signal strengths at two separated locations are known, then the signal strength at a location that is between the two separated locations can be generally estimated as the average of the signal strengths at the two separated locations. This means that it might not be necessary to determine or predict the signal strength at every coverage location in an environment. Rather, the signal strengths at certain select "coverage pivots" can be determined or predicted, and such information can be used to extrapolate the signal strengths for the other coverage locations. This reduced effort advantageously allows for "reduced ray tracing" (described in more detail below).

Referring now to FIG. 2A, at 202, the hybrid signal propagation modeling and prediction platform 200*p* may obtain information regarding a scenario. The scenario may involve one or more cell sites (e.g., one or more cell towers) that are located in a geographic area and that are surrounded by various objects (e.g., buildings or other structures). In various embodiments, the hybrid signal propagation modeling and prediction platform 200*p* may obtain data, such as global positioning system (GPS) coordinates or the like, regarding the cell site(s) and/or the various surrounding objects to determine their relative positions with one another.

At 204, the hybrid signal propagation modeling and prediction platform 200*p* may identify one or more coverage locations. As an example, 204 of FIG. 2A depicts twelve identified coverage locations. In one or more embodiments, the hybrid signal propagation modeling and prediction platform 200*p* may obtain information (e.g., from an administrator, a database, etc.) regarding target coverage areas of interest, and may utilize that information to identify the coverage locations, their sizes and/or shapes, and/or other physical properties, such as their center points.

At 206, the hybrid signal propagation modeling and prediction platform 200*p* may identify one or more coverage pivots from the coverage location(s). As an example, 206 of FIG. 2A depicts five identified (i.e., highlighted) coverage pivots, which is a fraction of the twelve coverage locations. As another example, reference number 220 of FIG. 2A depicts two coverage pivots selected from six coverage locations of a building structure. In exemplary embodiments, the hybrid signal propagation modeling and prediction platform 200*p* may identify coverage pivots based on information regarding (or characteristics of) a given scenario. For instance, the hybrid signal propagation modeling and prediction platform 200*p* may identify a coverage location as a coverage pivot based on where the coverage location is positioned within a given scene or environment (e.g., relative to a cell site). In a case where the environment or scene is such that it can be divided into or defined by uniform coverage locations—e.g., reference number 220— selecting a threshold number of coverage locations as coverage pivots may be sufficient for the above-described signal strength extrapolation. In a different case where the environment or scene is such that it cannot be divided into or defined by uniform coverage locations—e.g., 206 or an open area or perhaps a structure that is configured non-uniformly, a different method may be used or additional coverage pivots may be needed. In certain embodiments, coverage pivot identification may involve use of an optimization algorithm for determining the number of and locations of the coverage pivots depending on the scene. Thus, the definition of, or manner of selection of, coverage pivots allows for non-uniform spread and considers the varying structures/materials that make up a given scene.

At 208*a*, the hybrid signal propagation modeling and prediction platform 200*p* may determine angles of departure (AODs) for the coverage pivots, and at 208*b*, the hybrid signal propagation modeling and prediction platform 200*p* may perform reduced ray tracing based on the determined angles to facilitate estimation of coverage values (e.g., signal strengths) for the coverage pivots. In exemplary embodiments, the hybrid signal propagation modeling and prediction platform 200*p* may utilize one or more deep learning model(s) to perform step 208*a* (described in more detail below).

A naive solution for estimating signal strength at all coverage locations might be to compute the free space path loss values for the coverage pivots and use them to estimate the final RSRP for the remaining coverage locations. It is believed that such a solution would not work in practice, however, since the free space path loss computation does not consider the multi-path reflections (i.e., the non-line-of-sight components) that contribute towards the received signal strength. It might be possible to utilize multi-path models to approximate the impact of multi-path reflections, but these model-driven approaches would not provide accurate coverage values for applications such as RF safety audits.

With reference to step 208*b*, the hybrid signal propagation modeling and prediction platform 200*p* may facilitate ray tracing only for the coverage pivots—hence, reduced ray tracing. Traditional ray tracing methods, such as 'shoot and bounce,' identify the paths to a coverage location by randomly emitting photons uniformly in every direction from the point of origin (e.g., cell tower). The higher the emitted photon count, the higher the resulting coverage estimates. The underlying assumption in traditional ray tracing is that there is no knowledge of the environment at the outset, and thus, rays need to be emitted in all directions to identify surrounding objects (e.g., buildings, etc.). This requires numerous iterations of photon emissions before the proper directions to emit photons can be determined. This reflects the inherent complexity of ray tracing; one can never be sure which directions photons should be emitted in for a given coverage location unless photons are emitted in all directions to eventually determine the appropriate directions.

Thus, rather than sending rays in all directions, the hybrid signal propagation modeling and prediction platform 200*p* may (at step 208*a*) determine the directions in azimuth and/or elevation that photons should be emitted in for the coverage pivots, based on knowledge of the coverage pivots, characteristics of the surrounding environment, and the location of the cell site (e.g., cell tower). This reduces or eliminates the need for the ray tracer to undergo the aforementioned photon emission iterations.

Figure 2B:
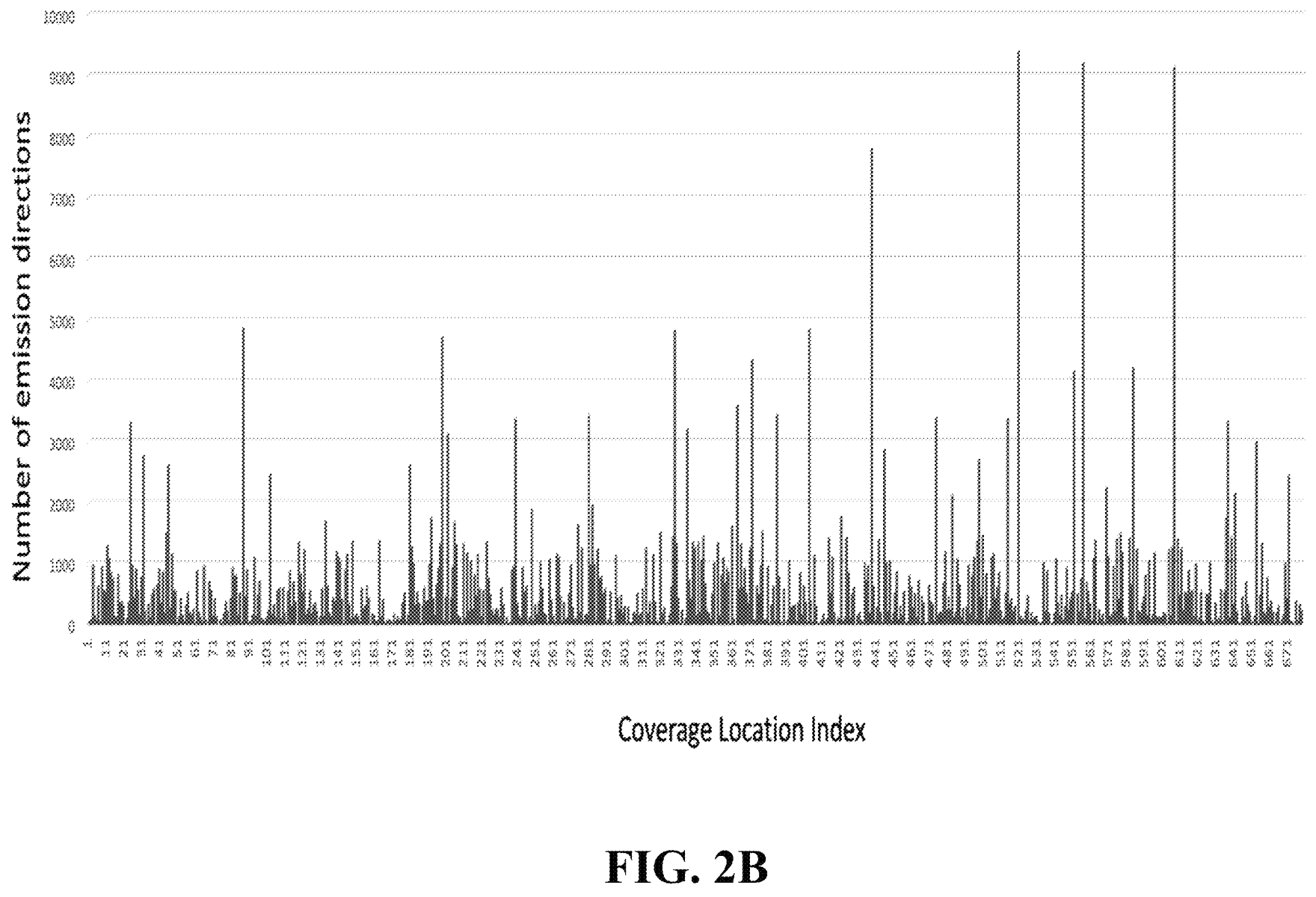

The following is a brief description of some preliminary analysis for quantifying the resulting reduction in ray tracing effort. Let $\Theta$ and $\phi$ represent the respective azimuth and elevation angles in which photons can be emitted. A cell site's azimuth angle values can vary from 0 to 360 degrees, and its elevation angle values can vary from 0 to 180 degrees. Treating the angles as continuous values complicates the situation. Let us simplify by assuming that the angles are discrete with a one-degree precision. In one or more embodiments, the hybrid signal propagation modeling and prediction platform 200*p* may quantize the directions (e.g., 1 degree). This results in 64,800 azimuth, elevation angle combinations in which photons can be emitted. However, for a given coverage location, only a fraction of these emitted photons will reach the destination. FIG. 2B shows statistics on photon emission directions for 678 different coverage locations. As can be seen in the graph, there is a clear observable variance in the count for the various locations. The minimum is two; the maximum is 9,394; and the mean and the median are 608.178 and 316, respectively. Even for the coverage location with maximum photon emission directions, the number of photon emission directions is only 14.4% of all the possible directions. Thus, predicting the photon emission directions for a coverage location can allow for ray tracing simulation where photons are emitted in (e.g., only in) those directions. This can reduce ray tracing complexity by at least 25%, which is a considerable proportion. For instance, to provide some insight into the possible savings, let us explore the possible reductions for the coverage locations in FIG. 2B. Specifically, for the 678 coverage locations identified, rather than sending photons in 64,800 azimuth and elevation combinations, assume that photons are sent only in 47,880 directions. This is a 26.11% reduction in the number of emission directions. Furthermore, there would also be no need to transmit photons in arbitrary directions to determine the appropriate directions, as would otherwise be required if knowledge of the predicted photon emission directions (i.e., the appropriate directions to emit photons) was not available. In any case, if $t_i$ represents the time that is required to determine whether an emitted photon actually reaches a destined coverage location, having a priori knowledge of the emission directions results in a savings of 26.11*$t_i$ in computation time for the coverage locations.

Figure 2C:
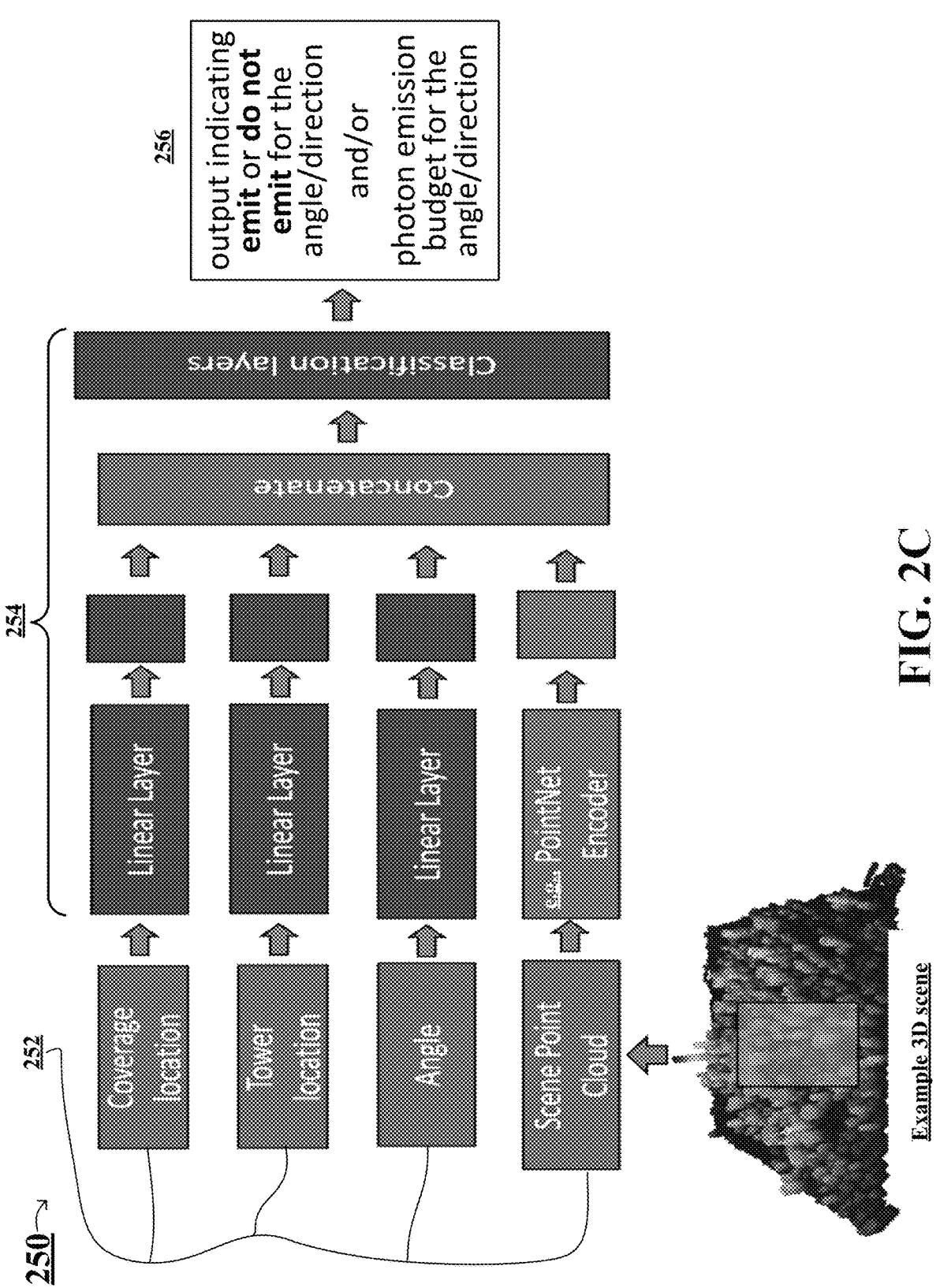
FIG. 2C shows an example, non-limiting deep learning model for predicting photon emission directions and/or photon emission budgets for different angular directions, in accordance with various aspects described herein.

FIG. 2C shows an example, non-limiting deep learning model 250 for determining or predicting, for each coverage location, appropriate photon emission directions (i.e., AODs) and/or photon emission budgets for different emission directions, in accordance with various aspects described herein. In exemplary embodiments, the hybrid signal propagation modeling and prediction platform 200p may utilize the deep learning model 250 to perform step 208a of FIG. 2A. In one or more embodiments, the deep learning model 250 may be included in, or correspond to, the AI architecture 180 of FIG. 1B. As depicted in FIG. 2C, the deep learning model 250 may be implemented in layers, including an input layer 252 of node(s), hidden layers 254 of node(s), and an output layer 256 of node(s). Although not shown, in some implementations, the node(s) of the input layer 252 may be communicatively coupled, or connected to, one or more of the nodes of one or more of the hidden layers 254 and/or the the node(s) of the output layer 256 may be communicatively coupled, or connected to, one or more of the nodes of one or more of the hidden layers 254.

As shown in FIG. 2C, a 3D scene representing an environment may be converted into dense point cloud data. The hybrid signal propagation modeling and prediction platform 200p may utilize any suitable technique(s) or algorithm(s) to perform the conversion. The input layer 252 of the deep learning model 250 may input data, such as the location (e.g., Cartesian coordinates) of a cell site center (e.g., cell tower) and the coverage location center of interest, the emission direction (i.e., angle), which the linear layers in the hidden layers 254 may consume or process in parallel to project the data into higher dimensions. "Coverage" here may be defined based on a selected area (i.e., the highlighted region in the example 3D scene shown). Vertices of this defined region may be extracted and input into an encoder (e.g., a PointNet encoder, such as that described in Charles R. Qi et al., "PointNet: Deep Learning on Point Sets for 3D Classification and Segmentation," arXiv:1612.00593, 2017, which is incorporated by reference herein in its entirety) to extract feature representations from the example 3D scene. For instance, the example 3D scene shown in FIG. 2C may corresond to the scenario (202) shown in FIG. 2A. The resulting feature representations from the linear layers and the encoder may be concatenated and passed to a series of subsequent linear layers that classify whether a photon should be emitted at the given angle or not. In various embodiments, the classification layers may be trained (i.e., via supervised training) to predict whether photons should be emitted for various angles (e.g., all angles of a quantized set of angles) based on cell site (e.g., tower) location, coverage location, and different scene characteristics (e.g., obstacles, etc.). In exemplary embodiments, different instances of the deep learning model 250 may be provided, one for azimuth angles and another for elevation angles. In this way, the hybrid signal propagation modeling and prediction platform 200p may train a deep learning model 250 to predict whether to emit photons in azimuth directions and also train another deep learning model 250 to predict whether to emit photons in elevation directions. In certain embodiments, the deep learning model(s) 250 may additionally be trained to determine a photon emission budget—i.e., the number of photons to emit for the given angle.

In one or more embodiments, the hybrid signal propagation modeling and prediction platform 200p may obtain all of the indications of emit/do not emit for the various angles in azimuth and elevation, and generate instructions for input to the ray tracing simulator 190. For instance, in a case where the deep learning model(s) 250 are used to predict emission directions only for certain selected coverage pivots, the hybrid signal propagation modeling and prediction platform 200p may perform ray tracing only for those directions in which the deep learning model(s) 250 determine photons should be emitted.

Returning to FIG. 2A, at 210, the hybrid signal propagation modeling and prediction platform 200p may estimate the coverage (e.g., signal strengths) at the coverage pivots based on the reduced ray tracing, and at 212, the hybrid signal propagation modeling and prediction platform 200p may estimate the signal strengths at the remaining coverage locations (e.g., based on information, such as relative position data, etc.). In one or more embodiments, the hybrid signal propagation modeling and prediction platform 200p may employ one or more algorithms or models for this latter estimation, which may involve extrapolation techniques using the estimated signal strengths at the coverage pivots as inputs.

In an example implementation of the above-described hybrid signal propagation modeling and prediction platform 200p that serves as a proof of concept, ray tracing simulations were made to test a model for various locations of interest around a single cell site (e.g., cell tower). The ray tracing simulator utilized a budget of ten million photons with the cell tower at the center of the scene. The evaluation was constrained to a 100 meter by 100 meter coverage area surrounding the cell tower for training and validation purposes. A reasonable assumption is that the results should extend to coverage locations beyond this coverage area. A random selection of 800 coverage location centers within the coverage area—i.e., center points (e.g., 3D cartesian coordinates, such as X, Y, Z) of 800 coverage pivots—was made for evaluation. Each coverage pivot was treated as a cube having a center point as the coverage location center. Photons within two meters of each coverage location center were identified as being part of the coverage location. During ray tracing simulation for a given coverage location, photons were traced from the cell tower to that coverage location to obtain an emission direction (i.e., angle in azimuth and/or elevation). This was done for each of the selected 800 coverage locations. Next, 85% of those coverage locations (i.e., 680 of them) were selected for deep learning model training and the remaining 15% were selected for testing/validation of the trained deep learning models.

Because there are 64,800 combinations of quantized azimuth and elevation angles, and most do not correspond to photon emission, this results in most training samples having a zero budget. For the 680 coverage locations that were chosen for training, approximately 14% of them had some budget, while the remaining 86% of them had none. This resulted in a significant data imbalance, making it difficult for the model to learn the per-angle photon budget. To address this challenge, we first separated the budget into two separate problems for azimuth and elevation. Next, we addressed the imbalance by resampling the samples with a photon budget such that the distribution of samples with and without a photon budget was equal. That is, the number of samples with a photon budget (i.e., emit) is increased so as to better balance that with the number of samples with zero photon budget (i.e., do not emit), which avoids the models from being trained in a biased way. Finally, instead of regressing the budget, we turned the problem into a classification problem—i.e., where the model predicts whether to emit or not for a particular angle.

Tables 1 and 2 below show the confusion matrix for two models-one for predicting photon emissions along the azimuth angle and the other for predicting the photon emissions along the elevation angle. We found that, without data balancing, there are significant false negatives. Specifically, the model misclassifies 22% and 44.39% of emission angles for elevation and azimuth directions, respectively. This shows that a simple data balancing strategy helps address the problem of inherent data imbalance. As the number of azimuth angles is twice the number of elevation angles, there is some difference in performance. The model for azimuth angles offers 84.5% accuracy, while the model for elevation angles offers 88.62% accuracy.

TABLE 1

Predictions for Azimuth angle, tested on 110 coverage locations

|  | Without Data balancing | | With Data balancing | |
| --- | --- | --- | --- | --- |
| Do not Emit | 14843 | 861 | 13620 | 2084 |
| Emit | 976 | 3295 | 188 | 4083 |
|  | Do not Emit | Emit | Do not Emit | Emit |

TABLE 2

Predictions for Elevation angle, tested on 110 coverage locations

|  | Without Data balancing | | With Data balancing | |
| --- | --- | --- | --- | --- |
| Do not Emit | 33032 | 1163 | 28689 | 5506 |
| Emit | 3998 | 5007 | 1188 | 7817 |
|  | Do not Emit | Emit | Do not Emit | Emit |

Embodiments of the hybrid approach, described herein, can save compute time by significantly reducing the photon emission directions and iterations needed to converge on the required photon emission directions. Results from example implementations show that such predictions can be made with 84% to 88% accuracy. To determine the effect on ray tracing, predictions obtained from the deep learning model (s) were used to filter out the photon records from the ray tracing simulation. All the photon records corresponding to the azimuth, elevation angles that the deep learning model(s) predicted to emit were selected. Next, this was repeated for the ground truth data—that is, the actual angle combinations used for training for each coverage location in the test. The total photons returned for each coverage location were then compared. From this, it was determined that filtering based on the predictions by the deep learning model(s) (which have been trained for all angles) resulted in 76.49% photons returned on average for each coverage location, compared to what would have been returned by doing a complete ray tracing simulation. In essence, the above-described hybrid approach was shown to provide about 20% improvement in efficiency gains, which advantageously translates into a 20% reduction in operating expenses required for signal propagation modeling and prediction.

It is to be understood and appreciated that, although one or more of FIGS. 1A to 1C, 2A, and 2C might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various components, devices, systems, modules, layers, etc. may have been illustrated in one or more of FIGS. 1A to 1C, 2A, and 2C as separate components, devices, systems, modules, layers, etc., it will be appreciated that multiple components, devices, systems, modules, layers, etc. can be implemented as a single component, device, system, module, layer, etc., or a single component, device, system, module, layer, etc. can be implemented as multiple components, devices, systems, modules, layers, etc. Additionally, functions described as being performed by one component, device, system, module, layer, etc. may be performed by multiple components, devices, systems, modules, layers, etc., or functions described as being performed by multiple components, devices, systems, modules, layers, etc. may be performed by a single component, device, system, module, layer, etc.

FIG. 2D depicts an illustrative embodiment of a method 270 in accordance with various aspects described herein.

At 270a, the method can include obtaining data regarding an environment associated with a cell site. For example, the hybrid signal propagation modeling and prediction platform 200p can, similar to that described above with respect to FIGS. 2A and/or 2C, perform one or more operations that include obtaining data regarding an environment associated with a cell site.

At 270b, the method can include identifying one or more coverage pivots from a plurality of coverage locations in the environment. For example, the hybrid signal propagation modeling and prediction platform 200p can, similar to that described above with respect to FIGS. 2A and/or 2C, perform one or more operations that include identifying one or more coverage pivots from a plurality of coverage locations in the environment.

At 270c, the method can include utilizing one or more machine learning (ML) models to determine emission directions for the one or more coverage pivots based at least in part on locations of the one or more coverage pivots and the cell site in the environment, resulting in determined emission directions. For example, the hybrid signal propagation modeling and prediction platform 200p can, similar to that described above with respect to FIGS. 2A and/or 2C, perform one or more operations that include utilizing one or more machine learning (ML) models to determine emission directions for the one or more coverage pivots based at least in part on locations of the one or more coverage pivots and the cell site in the environment, resulting in determined emission directions.

At 270d, the method can include causing ray tracing simulation to be performed using the determined emission directions, wherein the ray tracing simulation enables first signal coverage estimates to be derived for the one or more coverage pivots and used to extrapolate second signal coverage estimates for a remainder of the plurality of coverage locations. For example, the hybrid signal propagation modeling and prediction platform 200p can, similar to that described above with respect to FIGS. 2A and/or 2C, perform one or more operations that include causing ray tracing simulation to be performed using the determined emission directions, wherein the ray tracing simulation enables first signal coverage estimates to be derived for the one or more coverage pivots and used to extrapolate second signal coverage estimates for a remainder of the plurality of coverage locations.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
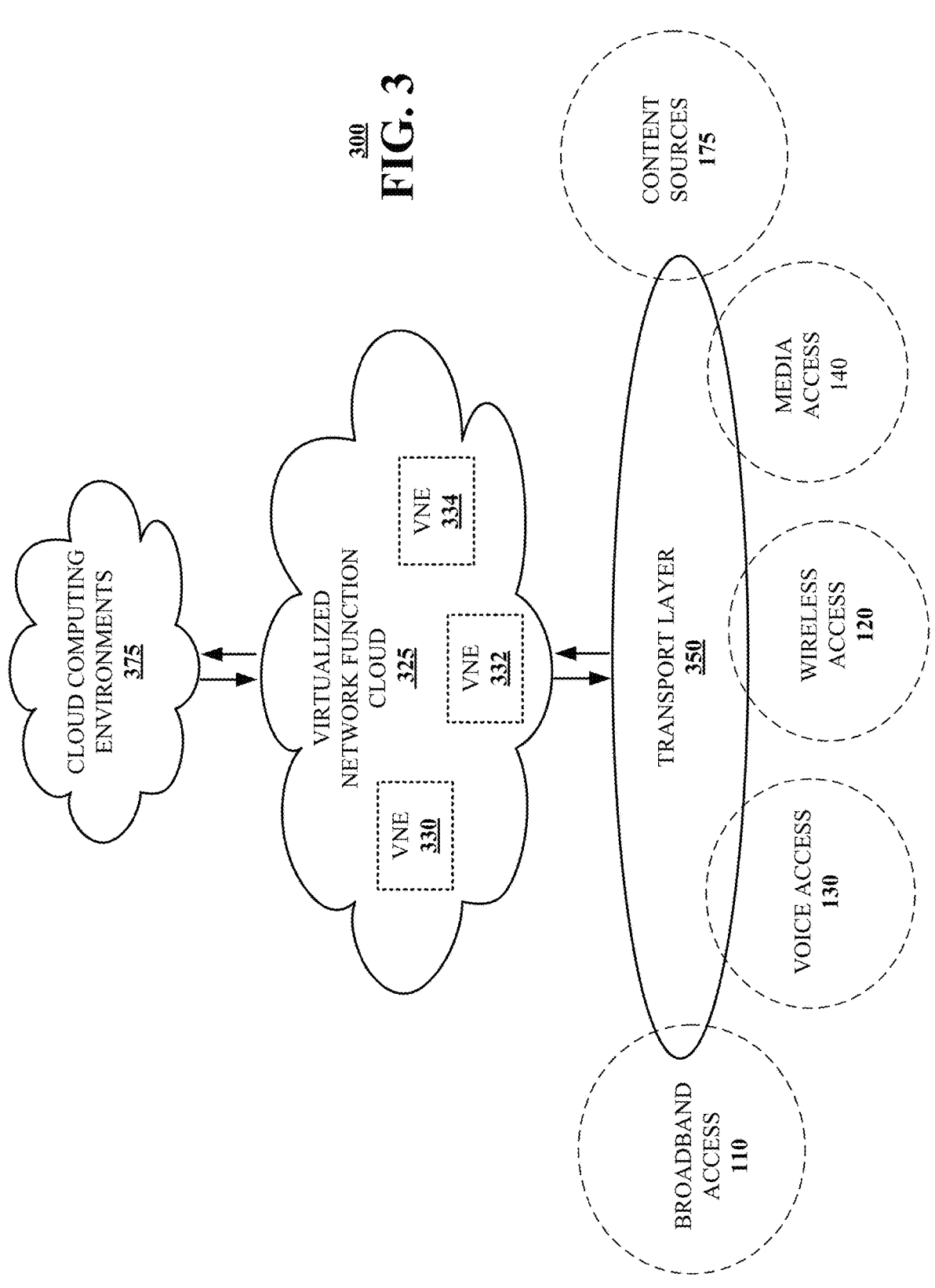
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of systems 180, 190, 200p, 250, and method 270 presented in FIGS. 1A to 1C, 2A, 2C, and 2D. For example, virtualized communications network 300 can facilitate, in whole or in part, prediction of received RF signal strength at different coverage locations within a coverage area of a wireless communication system.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1A), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
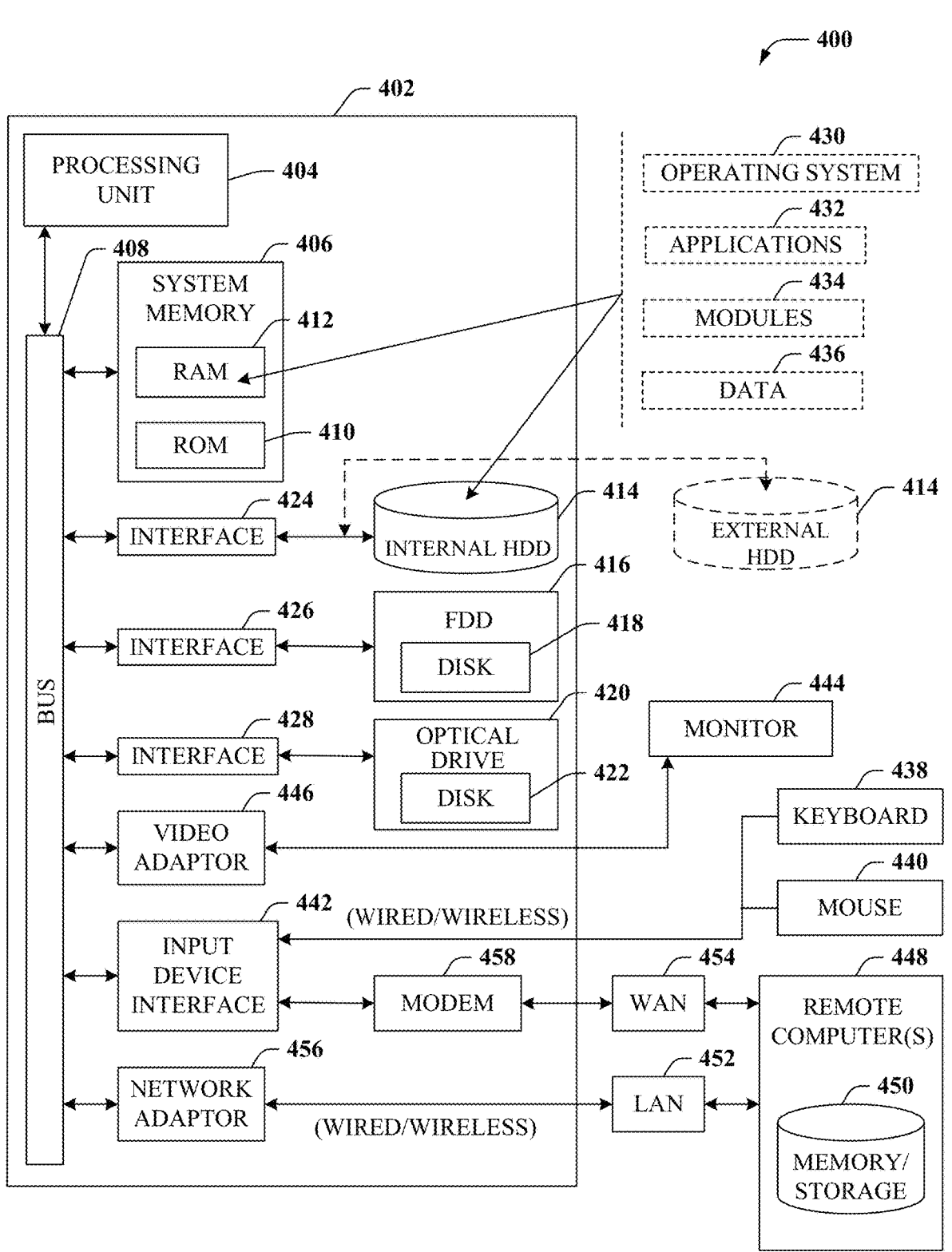
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, prediction of received RF signal strength at different coverage locations within a coverage area of a wireless communication system.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
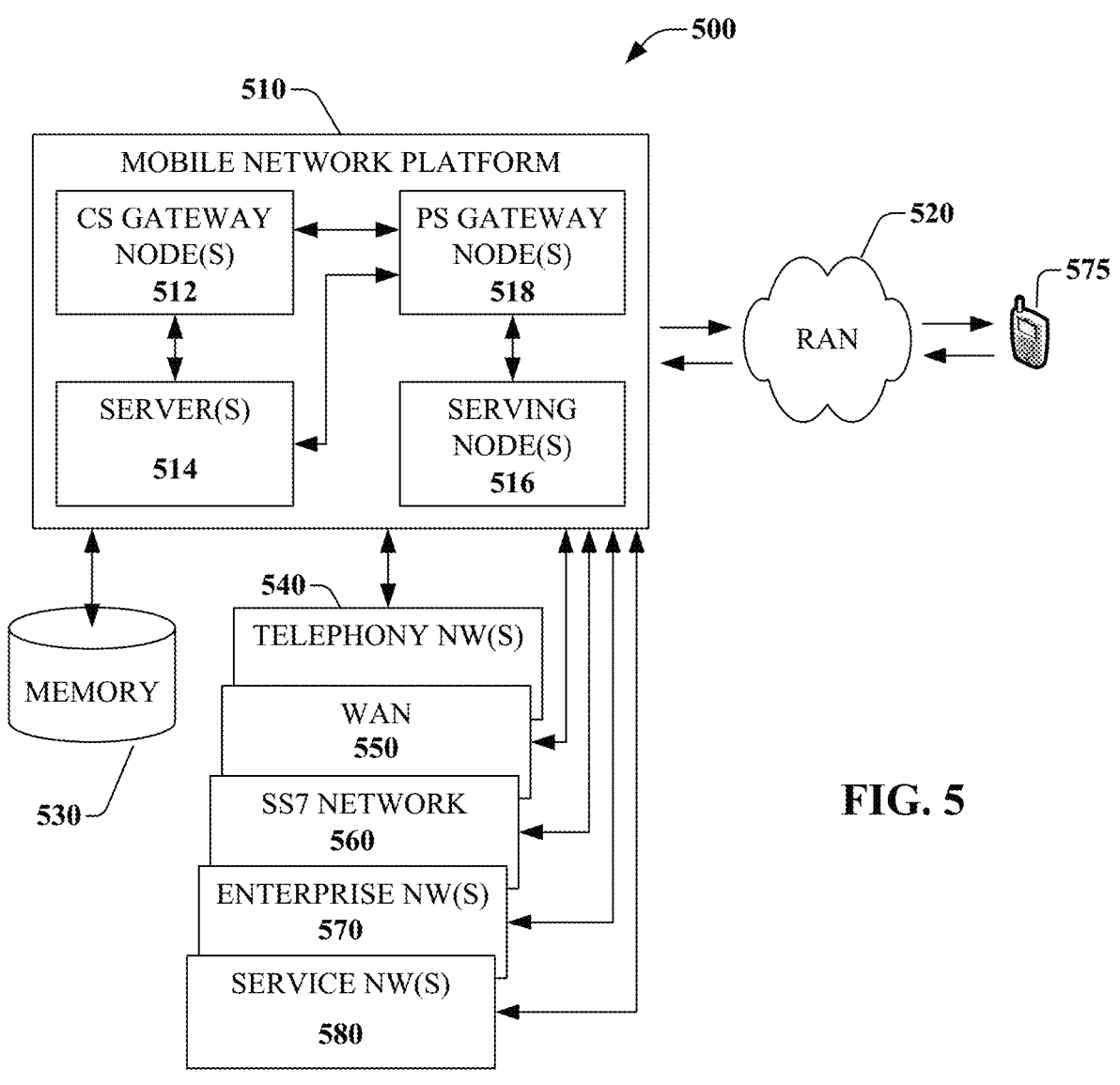
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, prediction of received RF signal strength at different coverage locations within a coverage area of a wireless communication system. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
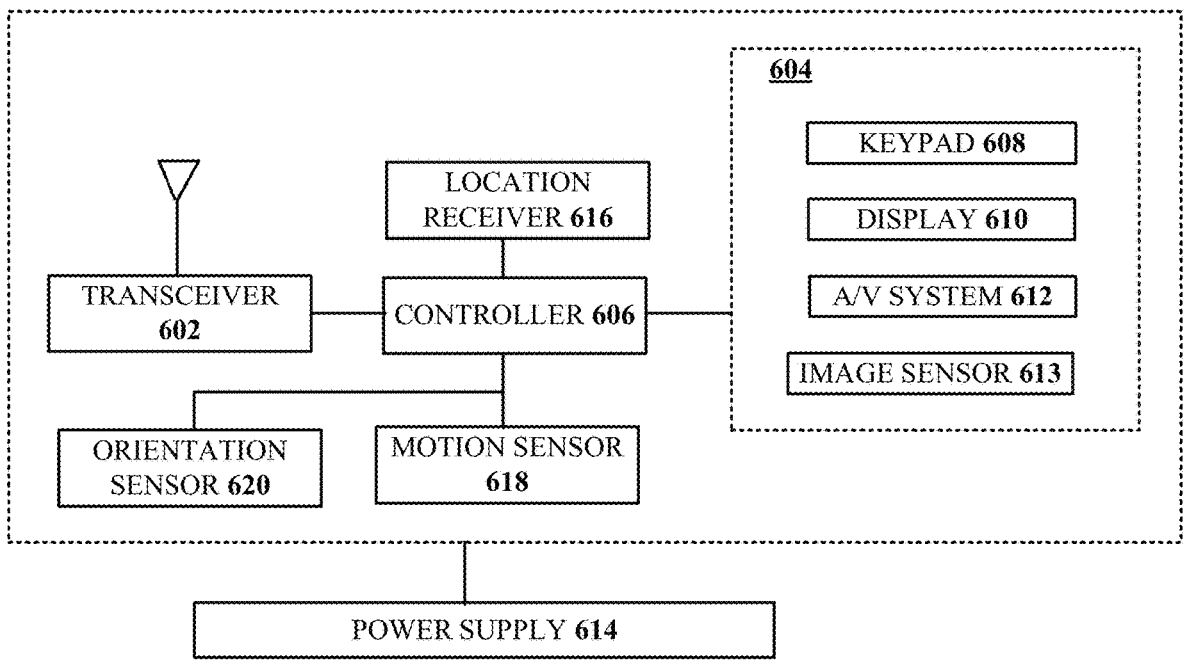
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, prediction of received RF signal strength at different coverage locations within a coverage area of a wireless communication system.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device

600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In various embodiments, AI or ML algorithm(s) described herein may be configured to reduce any error in the photon emission direction predictions, appropriate action(s) to take, and so on. In this way, any error that may be present may be provided as feedback to the algorithm(s), such that the error may tend to converge toward zero as the algorithm(s) are utilized more and more.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=\text{confidence (class)}$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. It is also to be understood and appreciated that the subject matter in one or more dependent claims may be combined with that in one or more other dependent claims.

What is claimed is:

1. A method, comprising:

obtaining, by a processing system including a processor, data regarding an environment associated with a cell site;

identifying, by the processing system, one or more coverage pivots from a plurality of coverage locations in the environment;

utilizing, by the processing system, one or more machine learning (ML) models to determine emission directions for the one or more coverage pivots based at least in part on locations of the one or more coverage pivots and the cell site in the environment, resulting in determined emission directions; and causing, by the processing system, ray tracing simulation to be performed using the determined emission directions, wherein the ray tracing simulation enables first signal coverage estimates to be derived for the one or more coverage pivots and used to extrapolate second signal coverage estimates for a remainder of the plurality of coverage locations.

2. The method of claim 1, wherein the ray tracing simulation involves only the determined emission directions and not any other emission directions, thereby providing for reduced ray tracing as compared to a case where the other emission directions are also simulated.

3. The method of claim 1, wherein the one or more ML models comprise one or more deep learning models.

4. The method of claim 3, wherein the emission directions include azimuth angles and elevation angles, and wherein the one or more deep learning models include a first deep learning model trained for azimuth angles and a second deep learning model trained for elevation angles.

5. The method of claim 3, wherein the utilizing involves inputting, to linear layers of the one or more deep learning models, point cloud information relating to the environment, angle information, information regarding a location of the cell site, information regarding a coverage pivot, or a combination thereof.

6. The method of claim 3, wherein the utilizing involves utilizing the one or more deep learning models to determine, for each of the one or more coverage pivots, whether to emit or not in one or more angles of a plurality of angles.

7. The method of claim 6, wherein the plurality of angles comprises a quantized set of angles.

8. The method of claim 3, wherein the one or more deep learning models include a concatenation layer and a plurality of classification layers.

9. The method of claim 1, wherein the emission directions comprise photon emission directions.

10. The method of claim 1, wherein the one or more ML models are further configured to determine one or more photon emission budgets.

11. The method of claim 1, wherein the first signal coverage estimates, the second signal coverage estimates, or both comprise reference signal received power (RSRP) estimates.

12. A device, comprising:

a processing system including a processor; and a memory that stores executable instructions that, when executed by the processing system, facilitate performance of operations, the operations comprising:

receiving data regarding an environment associated with a cell tower;

selecting one or more coverage pivots from a plurality of coverage locations in the environment;

employing one or more deep learning models to determine photon emission directions for the one or more coverage pivots based at least in part on locations of the one or more coverage pivots and the cell tower, resulting in determined photon emission directions; and causing a ray tracing simulator to simulate ray tracing only for the determined photon emission directions, wherein the ray tracing enables first signal coverage estimates to be derived for the one or more coverage pivots and used to extrapolate second signal coverage estimates for a remainder of the plurality of coverage locations.

13. The device of claim 12, wherein the photon emission directions include azimuth angles and elevation angles.

14. The device of claim 12, wherein the one or more deep learning models include a deep learning model trained for predicting whether emissions are to be made in an azimuth direction.

15. The device of claim 12, wherein the one or more deep learning models include a deep learning model trained for predicting whether emissions are to be made in an elevation direction.

16. The device of claim 12, wherein the employing involves inputting, to linear layers of the one or more deep learning models, point cloud information relating to the environment, angle information, information regarding a location of the cell tower, information regarding a coverage pivot, or a combination thereof.

17. A non-transitory machine-readable medium, comprising executable instructions that, when executed by a processing system including a processor, facilitate performance of operations, the operations comprising:

receiving information regarding determined emission directions; and performing ray tracing simulations based on the information, wherein the determined emission directions are output by one or more deep learning models that are trained to determine directions in which emissions are to be made, and wherein the one or more deep learning models are utilized to determine directions in which emissions are to be made for one or more coverage pivots selected from a plurality of coverage locations in an environment that includes a cell site, resulting in the determined emission directions.

18. The non-transitory machine-readable medium of claim 17, wherein the performing comprises performing the ray tracing simulations using only the determined emission directions and not any other emission directions, thereby providing for reduced ray tracing as compared to a case where the other emission directions are also simulated.

19. The non-transitory machine-readable medium of claim 17, wherein the determined emission directions include azimuth angles.

20. The non-transitory machine-readable medium of claim 17, wherein the determined emission directions include elevation angles.

* * * * *